United States Patent
Ozaki et al.

(10) Patent No.: US 6,863,354 B2
(45) Date of Patent: Mar. 8, 2005

(54) HYDRAULIC BRAKE PRESSURE CONTROL DEVICE OF LOAD RESPONSIVE TYPE

(75) Inventors: Yasuharu Ozaki, Anjo (JP); Naoki Iwata, Kariya (JP)

(73) Assignee: Advics Co., Ltd., Kariya (JP)

( * ) Notice: Subject to any disclaimer, the term of this patent is extended or adjusted under 35 U.S.C. 154(b) by 91 days.

(21) Appl. No.: 10/437,467

(22) Filed: May 14, 2003

(65) Prior Publication Data

US 2003/0214176 A1 Nov. 20, 2003

(30) Foreign Application Priority Data

May 14, 2002 (JP) ........................................ 2002-138717

(51) Int. Cl.[7] ................................................. B60T 8/18
(52) U.S. Cl. ..................................... 303/22.8; 303/22.1
(58) Field of Search ........................ 188/195; 303/22.1, 303/22.8

(56) References Cited

U.S. PATENT DOCUMENTS

| | | | |
|---|---|---|---|
| 4,060,283 A | | 11/1977 | Demido et al. |
| 4,623,200 A | * | 11/1986 | Ando et al. ................. 303/22.8 |
| 4,925,251 A | * | 5/1990 | Picot et al. ................. 303/22.1 |
| 5,215,171 A | * | 6/1993 | Longuet et al. ............. 188/195 |
| 5,226,693 A | * | 7/1993 | Levrai ........................ 303/9.69 |
| 5,653,513 A | | 8/1997 | Kobayashi |
| 6,074,017 A | | 6/2000 | Yamakoshi |
| 6,302,496 B1 | * | 10/2001 | Hartmann et al. ......... 303/22.8 |

FOREIGN PATENT DOCUMENTS

JP            60-156066 U     10/1985

* cited by examiner

Primary Examiner—Chris Schwartz
(74) Attorney, Agent, or Firm—Burns, Doane, Swecker & Mathis, L.L.P.

(57) ABSTRACT

In a hydraulic brake pressure control device of a load responsive type, a housing is attached to one of a rear wheel side member and a vehicle body side member which are connected with each other through a suspension mechanism and a lever is carried on the housing through a pivot axis to be pivotable toward the housing for direct or indirect abutting engagement with a piston formed with a valve portion. A spring member is interposed between a free end portion of the lever and the other of the rear wheel side member and the vehicle body side member for urging the lever toward the piston by means of a spring force depending on the distance between the rear wheel side member and the vehicle body side member. Further, an anti-vibration member is provided between the lever and the housing for moderating the collision of the lever with the piston when the lever is repetitively disengaged from, and engaged with, the piston during the vehicle running a bumpy road.

13 Claims, 7 Drawing Sheets

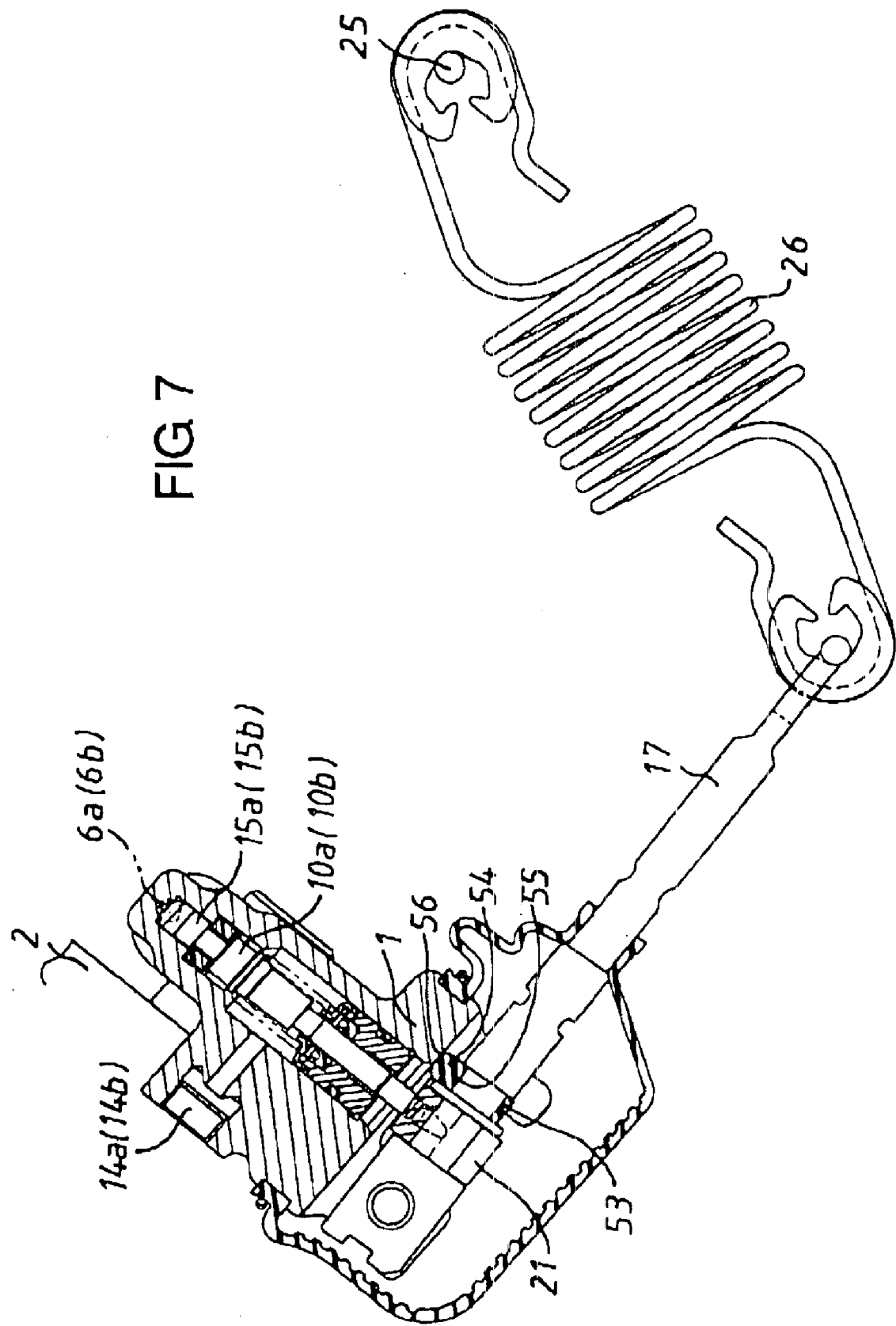

US 6,863,354 B2

HYDRAULIC BRAKE PRESSURE CONTROL DEVICE OF LOAD RESPONSIVE TYPE

INCORPORATION BY REFERENCE

This application is based on and claims priority under 35 U.S.C. sctn. 119 with respect to Japanese Application No. 2002-138717 filed on May 14, 2002, the entire content of which is incorporated herein by reference.

BACKGROUND OF THE INVENTION

1. Field of the Invention

The present invention relates to a hydraulic brake pressure control device of a load responsive type for controlling the hydraulic brake pressure which is supplied from a master cylinder to wheel cylinders for rear wheels in response to the load carried in a brake system for vehicles.

2. Discussion of the Related Art

Heretofore, in the field of automotive brake systems, there has been known a hydraulic brake pressure control device of a load-responsive type, wherein the hydraulic brake pressure supplied from a master cylinder is supplied to wheel cylinders for rear wheels as it is reduced in dependence upon the load carried. A housing of the device is attached to a vehicle body, and a lever which is in abutting engagement with a piston formed with a valve portion is pivotably carried on the housing. Between the rear wheel axle housing which supports the vehicle body by suspension mechanisms and a free end of the lever, there is further provided a spring member for urging the lever to contact the piston with the spring force which depends on the distance between the vehicle body and a rear axle housing.

In the brake hydraulic pressure control device as constructed above, however, the lever has a pivotal end in the direction toward the housing, in which end the lever is in abutting engagement with the piston formed with the valve portion. This configuration causes a problem to occur that when the vehicle runs on a bumpy road, the rear wheel axle housing is vibrated, and the lever is repetitively disengaged from, and engaged with, the piston thereby to generate an unpleasant or strange noise. In order that the lever is not disengaged from the piston upon the vibration of the rear axle housing, an attempt may be made that the spring member urging the lever toward the housing is changed to have a stronger spring force even when the vehicle carries a smaller load. However, such an attempt disadvantageously causes the hydraulic brake pressure to increase, so that the freedom of allocating the hydraulic brake pressures to front and rear wheels is diminished.

SUMMARY OF THE INVENTION

Accordingly, it is a primary object of the present invention to provided an improved hydraulic brake pressure control device of a load responsive type which is capable of hardly generating an unpleasant or strange noise due to the vibration of the lever even when the rear wheel axle housing is vibrated and of increasing the freedom in setting the allocation of brake forces to the front and real wheels.

Briefly, according to the present invention, there is provided a hydraulic brake pressure control device of a load responsive type having a housing attached to one of a rear wheel side member and a vehicle body side member which are connected with each other through a suspension mechanism; a lever carried on the housing through a pivot axis and pivotable toward the housing for direct or indirect abutting engagement with a piston formed with a valve portion, a part of the piston being slidably received in the housing; and a spring member interposed between a free end of the lever and the other of the rear wheel side member and the vehicle body side member for urging the lever toward the piston by means of a spring force depending on the distance between the rear wheel side member and the vehicle body side member. The hydraulic brake pressure control device further includes an anti-vibration member between the lever and the housing.

With this configuration, even when the lever is disengaged from the piston due to the vibration of the rear wheel side member which occurs during the vehicle running a bumpy road, the anti-vibration member is brought into abutting engagement with the housing before the lever comes into abutting engagement with the piston. Thus, the lever is decelerated prior to coming into collision with the piston, so that an unpleasant or strange noise is hardly generated. As a consequence, the spring force of the spring member for maintaining the lever in abutting engagement wit the piston during a small load being carried on the vehicle can be set small, or the lever can be maintained disengaged from the piston during the small load being carried on the vehicle. This advantageously enlarge the freedom in setting the allocation of the brake forces to the front and rear wheels.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which:

FIG. 7 is a longitudinal sectional view of the device according to a fifth embodiment of the present invention.

DETAILED DESCRIPTION OF THE PREFERRED EMBODIMENTS (First Embodiment)

Figure 1:
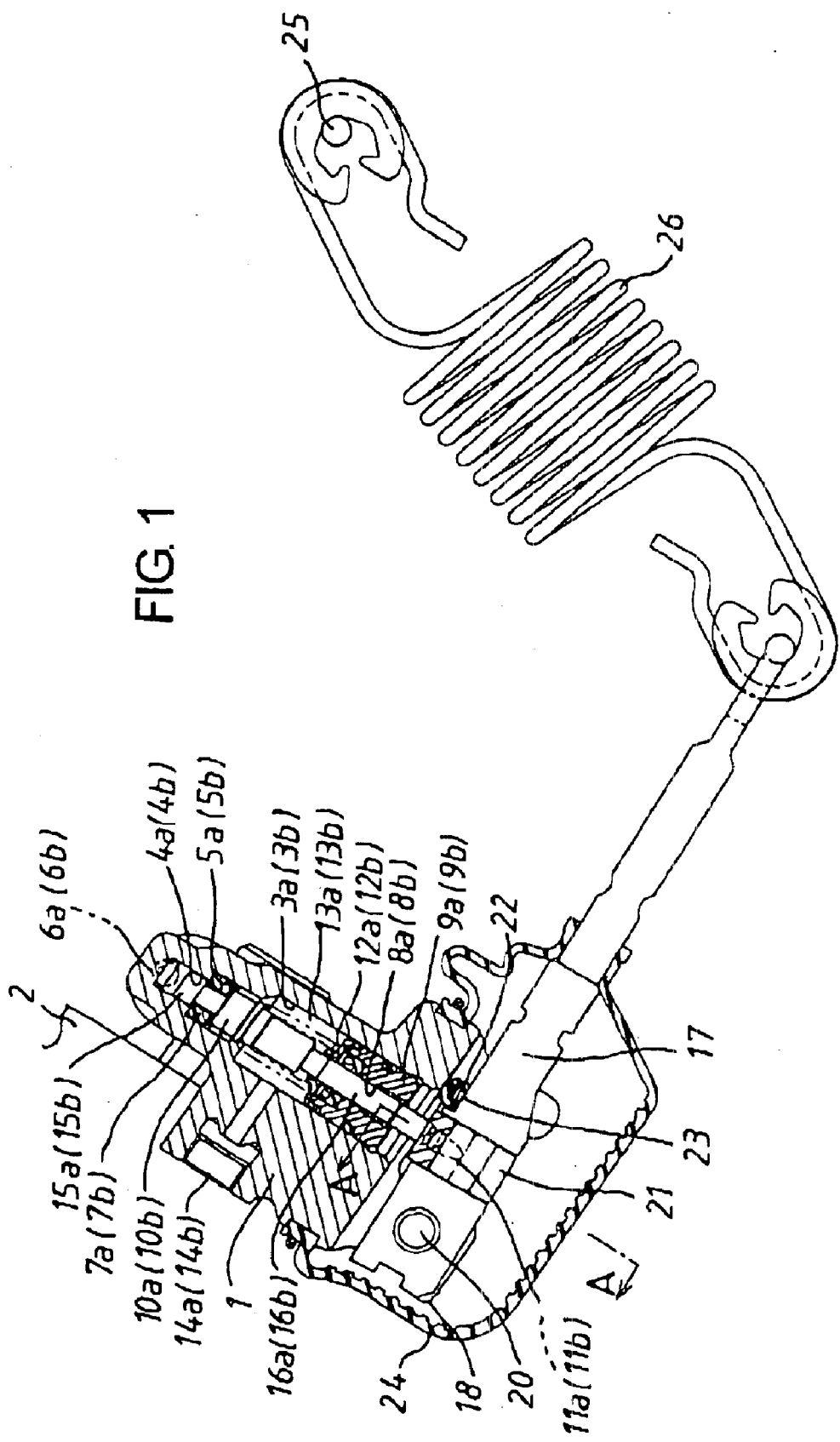
FIG. 1 is a longitudinal sectional view of a hydraulic brake pressure control device of a load responsive type according to a first embodiment of the present invention.
Figure 2:
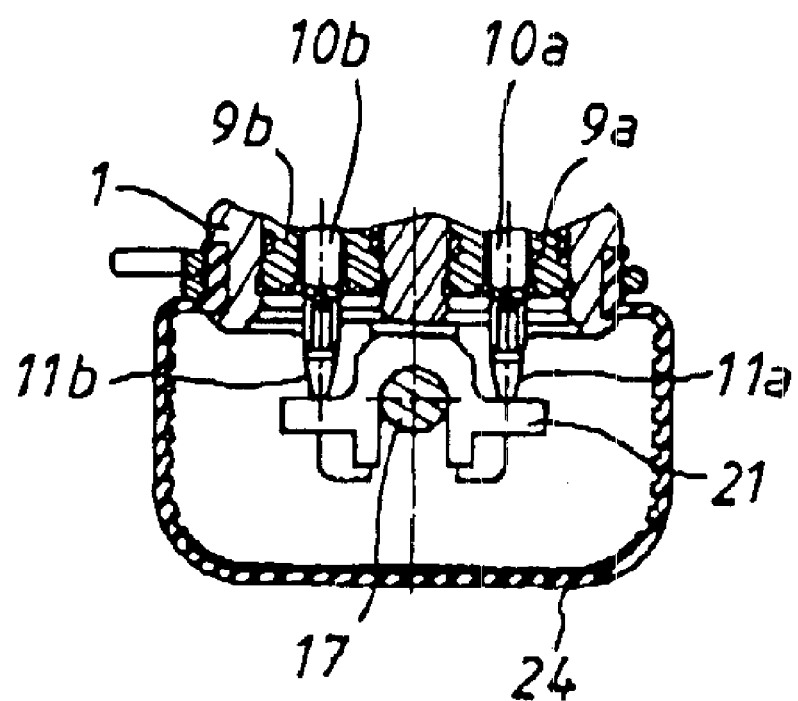
FIG. 2 is a cross-section taken along the line A—A in FIG. 1.

A hydraulic brake pressure control device of a load responsive type according to a first embodiment of the present invention will be described hereinafter with reference to the accompanying drawings. Referring now to FIGS. 1 and 2, a numeral 1 denotes a housing of the hydraulic brake pressure control device, and the housing 1 is fixed to a vehicle body side member 2 which may be any of those members movable bodily with a vehicle body (not shown).

A pair of valve holes 3a, 3b for right and left rear wheels are formed in the housing 1 with one being spaced from the other in a direction perpendicular to the drawing sheet. Output holes 4a, 4b and seal valve holes 5a, 5b are formed in a stepped form at the top portions of the valve holes 3a, 3b, respectively. The output holes 4a, 4b are connected with wheel cylinders (not shown) for the right and left rear wheels through output ports 6a, 6b, respectively. Annular seal valves 7a, 7b are fit in the seal valve holes 5a, 5b, respectively. Plug members 9a, 9b which have small diameter holes 8a, 8b passing through the axes thereof are fluid-tightly fit within openings at the lower ends of the valve holes 3a, 3b, respectively.

Numerals 10a, 10b denote a pair of pistons for the right and left rear wheels, and the pistons 10a, 10b are supported with their opposite ends being slidable within the output holes 4a, 4b and the small diameter holes 8a, 8b, respectively. The lowermost ends of the pistons 10a, 10b are protruded fluid-tightly from the housing 1 to constitute operating ends 11a, 11b, respectively. The pistons 10a and 10b are maintained urged to upper home positions by means of spring forces of compression springs 12a, 12b interposed between large diameter portions thereof and the plug members 9a, 9b, respectively. The valve holes 3a, 3b are formed with input chambers 13a, 13b between the seal valves 7a, 7b and the plug members 9a, 9b, respectively, and the input chambers 13a, 13b are in communication with a master cylinder (not shown) through input ports 14a, 14b. Valve portions 15, 15b of the pistons 10a, 10b fit in the output holes 4a, 4b are formed slightly larger than small diameter portions 16a, 16b of the pistons 10a, 10b fit in the small diameter holes 8a, 8b, respectively. Thus, when the fluid pressure supplied from the master cylinder to the input chambers 13a, 13b reaches a predetermined value, the fluid pressures acting on the differences between the cross-sections of the valve portions 15a, 15b and the cross-sections of the small diameter portions 16a, 16b cause the pistons 10a, 10b to be moved downward against the spring forces of the compression springs 12a, 12b, respectively. This causes end surfaces of the valve portions 15a, 15b to come into contact with the seal valves 7a, 7b, whereby the communications between the master cylinder and the wheel cylinders are disconnected, respectively.

A numeral 17 designates a lever, which is pivotably carried by means of a pin 20 between a pair of support portions 18 protruded from the lower surface of the housing 1 for pivot movement about the axis of the pin 20 which extends in parallel with a line intercepting the axes of the valve holes 3a, 3b. The lever 17 extends in a direction which divides the line equally and perpendicularly. The operating ends 11a, 11b of the pistons 10a, 10b protruding from the housing 1 are kept in abutting engagement with both ends of an equalizer 21, which is held in abutting engagement with the lever 17 at the center portion thereof. To be more exact, a cylindrical portion which is annually formed on the lever 17 is fit in, and held in abutting engagement with, a U-shape groove with a cylindrical bottom surface which groove is formed at the center portion of the equalizer 21. Abutting portions which are formed on the equalizer 21 to protrude oppositely therefrom are held in abutting engagement with the operating ends of the pistons 10a, 10b, respectively. Thus, the lever 17 is held in abutting engagement indirectly with the pair of pistons 10a, 10b.

A numeral 22 designates an anti-vibration member made of rubber, which is interposed between the lever 17 and the housing 1 at a portion on the line which divides equally and perpendicularly the line intercepting the pair of valve holes 3a, 3b. The member 22 is made to cover a protrusion with a boss which is protruded from a surface of the lever 17 facing the housing 1 and snugly fit in a neck portion of the protrusion so as not to be dislocated therefrom. The anti-vibration member 22 is interposed between the lever 17 and the housing 1 at a location spaced from the abutting point of the lever 17 with the equalizer 21, that is, the point where the lever 17 is held in indirect abutting engagement with the pistons 10a, 10b, in the direction toward the free end of the lever 17. A numeral 24 denotes a boot covering the operating ends 11a, 11b of the pistons 10a, 10b, a root portion of the lever 17, the anti-vibration member 22 and the like. The boot 24 is secured to the housing 1 with an upper opening edge portion thereof being fit in an annular groove formed at the external surface of the lower portion of the housing 1. A lateral hole of the boot 24 is tightly fit over an intermediate portion of the lever 17.

Further, a tension spring 26 interconnects the free end of the lever 17 and a rear wheel side member 25 which is connected with the vehicle body side member 2 through suspension mechanisms (not shown). Thus, the lever 17 is urged toward the pistons 10a, 10b by the spring force of the tension spring 26 which force depends on the distance between the rear wheel side member 25 and the vehicle body side member 2. The rear wheel side member 25 is a spring hooking member secured bodily with a rear axle housing (not shown) which supports the vehicle body through the suspension mechanisms. The rear wheel side member 25 may be any other member which is movable bodily with the rear axle housing relative to the vehicle body. On the other hand, the vehicle body side member 2 is a bracket secured bodily to the vehicle body to attach the housing 1. The vehicle body side member 2 may be any other member which is movable bodily with the vehicle body relative to the rear axle housing.

Operation

The operation of the first embodiment as constructed above will be described hereinafter When a brake pedal (not shown) is stepped on, the operating fluids supplied from the master cylinder (not shown) to the input ports 14a, 14b pass through the input chamber 13a, 13b, diametrically opposite axial slits formed on the pistons 10a, 10b, passages formed between the pistons 10a, 10b and the internal surfaces of the seal valves 7a, 7b, and clearances between end surfaces of the seal valves 7a, 7b and end surfaces of the valve portions 15a, 15b of the pistons 10a, 10b which are held at the home positions thereof by means of the spring forces of the compression springs 12a, 12b, respectively. The operating fluids so passing act on the end surfaces of the valve portions 15a, 15b and are supplied through the clearances around the valve portions 15a, 15b to the output ports 6a, 6b and further, to the right and left rear wheel cylinders (not shown).

Figure 3:
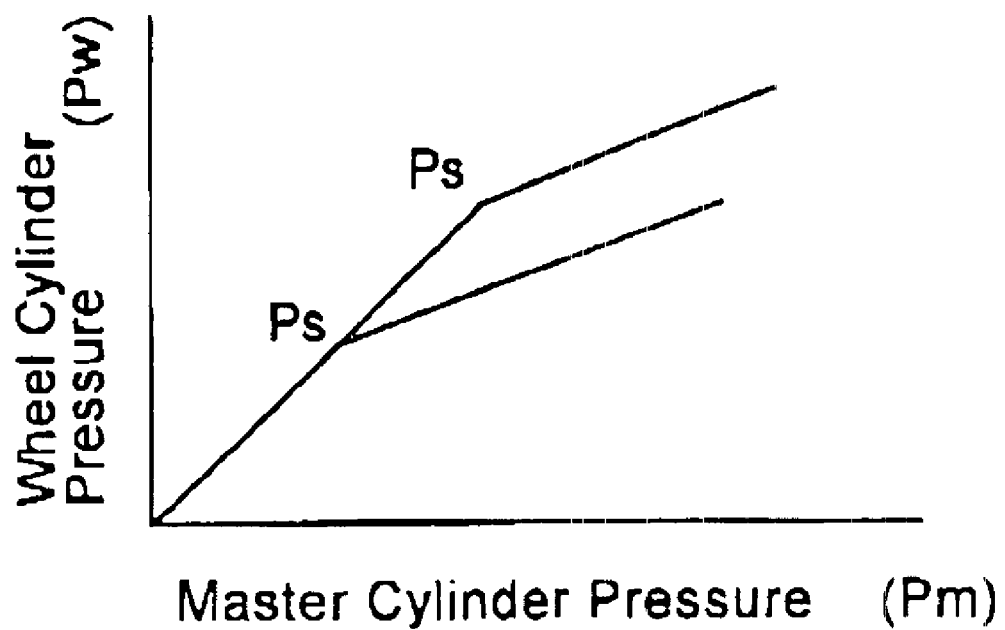
FIG. 3 is a graph representing the relation between a master cylinder hydraulic pressure Pm and a wheel cylinder hydraulic pressure Pw.

As shown in FIG. 3 indicating the relation between the fluid pressure Pm in the master cylinder and the fluid pressure Pw in the right and left rear wheel cylinders, until the fluid pressure Pm in the master cylinder reaches a predetermined pressure Ps, the fluid pressure Pm in the master cylinder is kept to be the same as the fluid pressure Pw in the right and left rear wheel cylinders. When the fluid pressure Pm in the master cylinder or the fluid pressure within the input chamber 13a (13b) exceeds the predetermined pressure Ps, the pressure acting on the difference in cross-section between the valve portion 15a (15b) and the small diameter portion 16a (16b) exceeds the spring force of the compression spring 12a (12b) and causes the pistons 10a (10b) to be moved downwards. Thus, the end surfaces of the valve portions 15a, 15b come into contact respectively with the seal valves 7a, 7b and disconnect the communications of the master cylinder with the right and left rear wheel cylinders.

After the end surfaces of the valve portions 15a, 15b come into contact respectively with the seal valves 7a, 7b, the fluid pressure Pw in the wheel cylinders is reduced relative to the fluid pressure Pm in the master cylinder in dependence on a balancing action of each of the pistons 10a, 10b. The balancing action is such that the sum of the spring force acting on the piston 10a (10b) and the force acting on the piston 10a (10b) as a result that the fluid pressure Pm in the master cylinder acts on the difference in cross-section between the valve portion 15a (15b) and the small diameter portion 8a (8b) is balanced with the force acting on the piston 10a (10b) as a result of that the fluid pressure Pw in the right (left) rear wheel cylinder acts on the cross-section of the valve portion 15a (15b).

When the load carried on the vehicle is increased, the vehicle body is lowered relative to the rear wheel axle housing. This causes the distance between the rear wheel side member 25 and the vehicle body side member 2 to be elongated thereby to stretch out the tension spring 26, whereby the lever 17 is urged by means of the spring force of the spring 26 depending on the load, toward the pistons 10a, 10b. Thus, the spring force of the tension spring 26 which is magnified by the action of the lever 17 is equally divided by means of the equalizer 21. Such equally divided forces, together with the spring forces of the compression springs 12a, 12b, are applied on the pistons 10a, 10b, respectively. Consequently, the predetermined pressure Ps at which the fluid pressures Pw of the right and left rear wheel cylinders begin to be reduced is increased as the load carried on the vehicle is increased.

In the state that the lever 17 can no longer be rotated by means of the tension spring 26 in the counterclockwise direction in FIG. 1 due to the load carried being large, the anti-vibration member 22 is in a preparatorily compressed state. In this state, when the fluid pressure Pm in the master cylinder reaches the predetermined pressure Ps, the pistons 10a, 10b are moved downward against the tension force of the tension spring 26 and the compression force of the compression springs 12a, 12b, so that the fluid pressure Pw in the right and left rear wheel cylinders begins to be reduced relative to the fluid pressure Pm in the master cylinder. In the outstanding feature of the embodiment, when the pistons 10a, 10b begin to rotate the lever 17 in the clockwise direction as described above, the anti-vibration member 22 is set to be no longer preparatorily compressed, so that the predetermined pressure Ps at which the fluid pressure Pm of the master cylinder begin to be reduced hardly fluctuates.

Where the vehicle travels on a bumpy road, the right and rear wheels are vertically vibrated to follow the roughness of the road. This causes the rear wheel side member 25 to vibrate, and the equalizer 21 in abutting engagement with the lever 17 is repetitively disengaged from, and engaged with, the pistons 10a, 10b. In this event, before the lever 17 is brought into contact with the pistons 10a, 10b through the equalizer 21, the anti-vibration member 22 is brought into contact with the housing 1, and the speed at which the lever 17 comes indirectly into collision with the pistons 10a, 10b is reduced, so that an unpleasant or strange noise is hardly generated. This advantageously makes it possible that the spring force for bringing the lever 17 into abutting engagement with the pistons 10a, 10b through the equalizer 21 is set to be small or allows the lever 17 to be kept disengaged from the pistons 10a, 10b, so that the freedom in setting the allocation of the brake forces to the front and rear wheels is enlarged.

Further, the anti-vibration member 22 is interposed between the lever 17 and the housing 1 at the side closer to the free end of the lever 17 than to the abutting point of the lever 17 with the equalizer 21. This arrangement may result in that in the state of the vehicle carrying a small load, the lever 17 is disengaged from the pistons 10a 10b and the anti-vibration member 22 is disengaged from the housing 1. In this case, even when the lever 17 is caused to vibrate, the anti-vibration member 22 is ensured to come into contact with the housing 1 in advance of the lever 17 being brought into engagement with the pistons 10a, 10 through the equalizer 21. In addition, where in the state of the vehicle carrying a small load, the lever 17 and the anti-vibration member 22 are disengaged from the pistons 10a, 10b and the housing 10, the anti-vibration member 22 is not preparatorily compressed, so that the spring force of the tension spring 26 which acts on the pistons 10a, 10b through the lever 17 can be precisely set.

(Second Embodiment)

Figure 4:
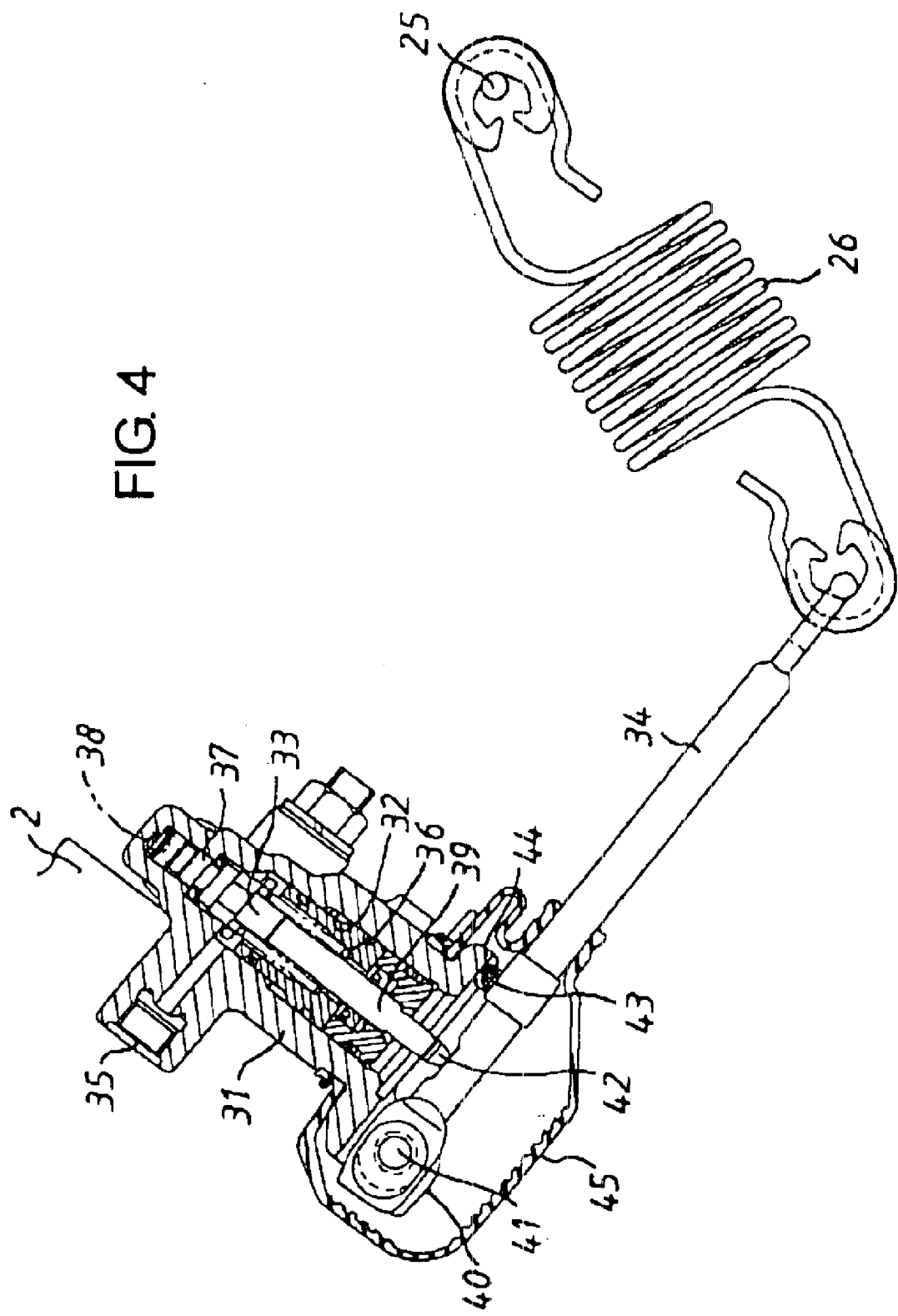
FIG. 4 is a longitudinal sectional view of the device according to a second embodiment of the present invention.

In a second embodiment shown in FIG. 4, a housing 31 is formed with one valve hole 32, and a piston 33 slidably inserted into the valve hole 32 is in direct abutting engagement with a lever 34 without an equalizer being interposed therebetween. Except for this configuration, the second embodiment is the same as the aforementioned first embodiment, and therefore, the following description will be made with respect to differences from the first embodiment. Until the fluid pressure Pm in a master cylinder (not shown) reaches a predetermined pressure Ps, the fluid pressure supplied from the master cylinder to an input port 35 is supplied from an output port 38 to right and left rear wheel cylinders (not shown) through a clearance formed between a seal valve and an end surface of a valve portion 37 formed on the piston 33 which is maintained at its home position by means of a compression spring 36.

When the fluid pressure Pm in the master cylinder exceeds the predetermined pressure Ps, the force which acts on the piston 33 in dependence on the difference in cross-section between the valve portion 37 and a small diameter portion 39 exceeds the spring force of a compression spring 36 to move the piston 33 downward. This causes the end surface of the valve portion 37 to contact with the seal valve thereby to disconnect the communication of the master cylinder with the wheel cylinders. As a result, the pressure Pw in the wheel cylinders is reduced relative to the pressure Pm in the master cylinder in dependence upon the balancing among spring forces acting on the piston 33 and forces which act on the piston 33 under the fluid pressures Pm and Pw in the master cylinder and the wheel cylinders.

A lever 34 is carried to pivot about a pin 41 between a pair of support portions 40 protruded from the lower surface of the housing 31. An operating end 42 of the piston 33 protruding from the housing 31 is kept in direct engagement with the lever 34. The lever 34 protrudes a protrusion 43 with a boss at a surface facing the housing 31 which surface is closer to the free end than the abutting point where the lever 34 is in abutting engagement with the piston 33. The protrusion 43 with the boss is covered with an anti-vibration member 41. The bottom portion of the housing 31 and the root portion of the lever 34 are covered with a boot 45. The housing 31 is secured to the vehicle body side member 2, and a tension spring 26 is hooked between the free end of the lever 34 and the rear wheel side member 25.

The operation of the second embodiment as constructed above will be described hereinafter. The fluid pressure supplied from the master cylinder to the input port 35 is not reduced until the fluid pressure Pm in the master cylinder reaches a predetermined pressure Ps, but when the fluid pressure Pm exceeds the predetermined pressure Ps, is reduced to be supplied from the output port 38 to the right and left rear wheel cylinders.

When the load carried on the vehicle is increased, the vehicle body is lowered relative to the rear axis housing (not shown), and the distance between the rear wheel member 25 and the vehicle body side member 2 is elongated. This causes the tension spring 26 to be stretched, and the lever 34 is urged toward the piston 33 by means of the spring force of the tension spring 26 depending on the load carried on the vehicle. Thus, the piston 33 comes to receive the spring force of the tension spring 26 acting on the free end of the lever 34, in addition to the spring force of the compression spring 36. Consequently, the predetermined pressure Ps in the master cylinder at which pressure the fluid pressure Pw in the right and left rear wheel cylinders begins to be reduced is increased as the load carried on the vehicle is increased.

When the vehicle is running on a bumpy road, the right and left rear wheels together with rear wheel side member 25 are vertically vibrated to follow the roughness of the road, and the lever 34 is repetitively brought into disengagement from, and engagement with, the piston 33. In this case, before the lever 34 is brought into abutting engagement with the piston 33, the anti-vibration member 44 is brought into abutting engagement with the housing 31, so that the speed at which the lever 34 comes into collision with the piston 33 is decelerated to hardly generate a strange or unpleasant noise.

Figure 5:
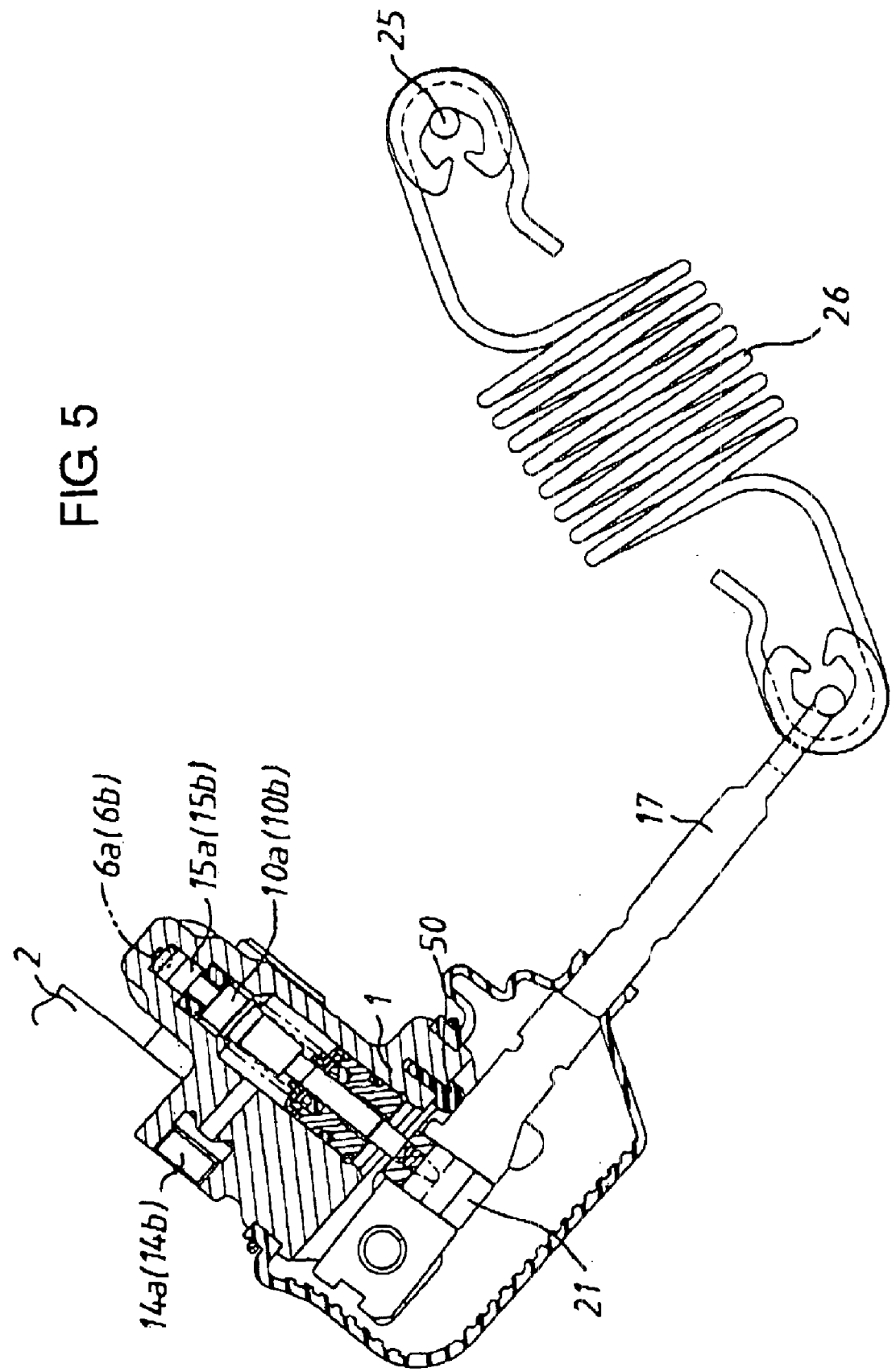
FIG. 5 is a longitudinal sectional view of the device according to a third embodiment of the present invention.
Figure 6:
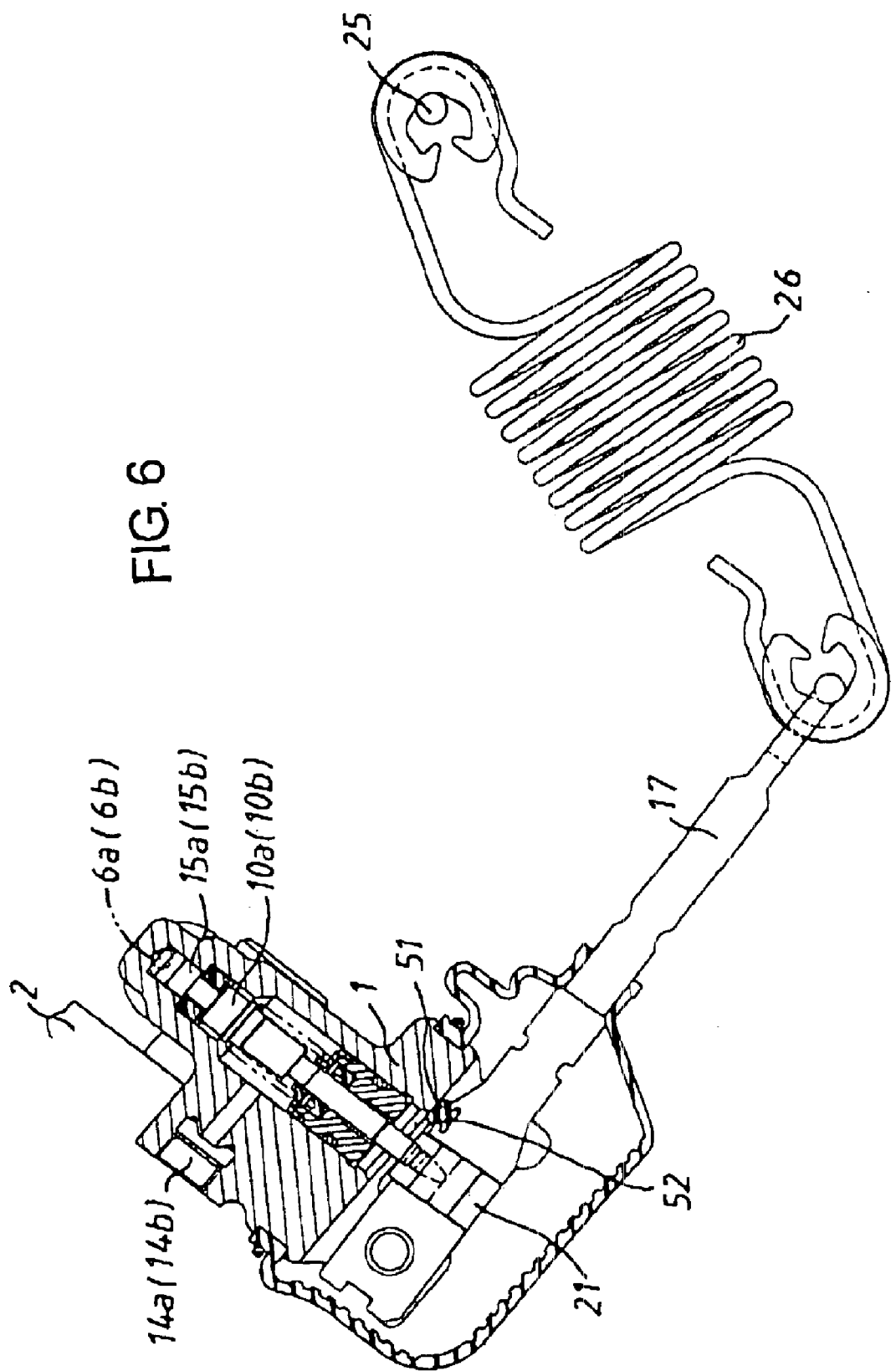
FIG. 6 is a longitudinal sectional view of the device according to a fourth embodiment of the present invention.

FIG. 5 shows a third embodiment according to the present invention, wherein an anti-vibration member 50 is secured to the housing 1. FIG. 6 shows a fourth embodiment according to the present invention, wherein an anti-vibration member 51 is secured to the lever 17 with a root portion thereof being embeded in a stepped hole 52 formed at the surface of the lever 17 facing the housing 1. FIG. 7 further shows a fifth embodiment according to the present invention, wherein the lever 17 is formed with an annular groove 53 at the side of the free end thereof in a juxtaposed relation with the annular groove in which the equalizer 21 is fit. The anti-vibration member 54 is tightly fit at an attaching hole 55 thereof in the annular groove 53, and an abutting portion 56 of the anti-vibration member 54 is protruded to face the bottom surface of the housing 1. In the third through fifth embodiments, other configurations thereof are same to those in the first embodiment, and the same reference numerals are put on the same component parts, so that detailed description thereof is omitted for the sake of brevity.

As described hereinbefore, a feature of the embodiments resides in that the anti-vibration member is interposed between the lever and the housing at a location towards the free end of the lever from the abutting point of the lever with the piston. This ensures that the anti-vibration member is brought into abutting engagement with the housing before the lever comes into abutting engagement with the piston, whereby the collision of the lever into the piston can be moderated.

Another feature of some of the embodiments is directed to bringing the anti-vibration member into abutting engagement with the housing on a line which perpendicularly and equally divides the line segment connecting the pair of pistons before the lever is brought into indirect abutting engagement with the pair of pistons through the equalizer. Thus, the speed at which the equalizer comes into collision with the pair of pistons can be reduced with the simple construction, and an unpleasant or strange noise is hardly generated. This advantageously results in enlarging the freedom in setting the allocation of the brake forces to the front and rear wheels.

In the foregoing embodiments, the housing is attached to the vehicle body side member, and the spring is hooked between the free end of the lever and the rear wheel side member. This arrangement may be modified such that the housing is attached to the rear wheel side member and the tension spring is hooked between the free end of the lever 17 and the vehicle body side member.

In the foregoing embodiments, the anti-vibration member is interposed between the lever and the housing at a portion closer than the portion where the lever is in direct or indirect abutting engagement with the piston. However, in a modification, the anti-vibration member may be interposed with itself being preparatorily compressed between the lever and the housing in the vicinity of the pivoting point about which the lever is supported on the housing to be pivotable, or at the side of such pivoting point.

Although one master cylinder is used in the foregoing first, third to fifth embodiment, a modification may be made to used a pair of master cylinders for respectively supplying the fluid pressures in the respective master cylinders to the input chambers through the input ports so that the right and left rear wheel cylinders are paired with the pair of the master cylinders, respectively.

Obviously, numerous modifications and variations of the present invention are possible in light of the above teachings. It is therefore to be understood that within the scope of the appended claims, the present invention may be practiced otherwise than as specifically described herein.

What is claimed to be secured by the Letters Patent of the United States is:

1. A hydraulic brake pressure control device of a load responsive type having a housing attached to one of a rear wheel side member and a vehicle body side member which are connected with each other through a suspension mechanism; a lever supported on the housing through a pivot axis and pivotable toward the housing for direct or indirect abutting engagement with a piston formed with a valve portion, a part of the piston being slidably received in the housing; and a spring member interposed between a free end portion of the lever and the other of the rear wheel side member and the vehicle body side member for urging the lever toward the piston by means of a spring force depending on the distance between the rear wheel side member and the vehicle body side member, wherein the hydraulic brake pressure control device further comprises an anti-vibration member between the lever and the housing, the anti-vibration member being positioned between the free end of the lever and a point at which the lever abuttingly engages the piston relative to a lengthwise extent of the lever.

2. A device as recited in claim 1, wherein the anti-vibration member is set to be brought into abutting engagement with the housing before the lever is brought into abutting engagement with the piston when the lever is pivoted toward the housing.

3. A device as recited in claim 2, wherein:
   the piston and another piston paired therewith are slidably inserted into the housing in parallel relation with each other;
   an equalizer is further provided with both ends thereof being in abutting engagements respectively with operating ends of the pair of pistons protruding from the housing, and with a center portion thereof being in abutting engagement with the lever; and
   the anti-vibration member is interposed between the lever and the housing on a line which perpendicularly and equally divides a line segment connecting the pair of pistons.

4. A device as recited in claim 1, wherein:

the piston and another piston paired therewith are slidably inserted into the housing in parallel relation with each other;

an equalizer is further provided with both ends thereof being in abutting engagements respectively with operating ends of the pair of pistons protruding from the housing, and with a center portion thereof being in abutting engagement with the lever; and the anti-vibration member is interposed between the lever and the housing on a line which perpendicularly and equally divides a line segment connecting the pair of pistons.

5. A device as recited in claim 4, wherein the distance between the rear wheel side member and the vehicle body side member changes with the change in the load carried on the vehicle.

6. A device as recited in claim 1, wherein the distance between the rear wheel side member and the vehicle body side member changes with the change in the load carried on the vehicle.

7. A device as recited in claim 1, wherein the lever is pivotable toward the housing for direct abutting engagement with the piston.

8. A load responsive type hydraulic brake pressure control device comprising a housing attached to one of a rear wheel side member and a vehicle body side member which are connected with each other through a suspension mechanism; a piston provided with a valve portion, at least a part of the piston being slidably received in the housing; a lever supported on the housing at a pivot axis and pivotable toward the housing for direct or indirect abutting engagement with the piston at an abutment; a spring member interposed between a free end portion of the lever and the other of the rear wheel side member and the vehicle body side member for urging the lever toward the piston by a spring force dependent upon the distance between the rear wheel side member and the vehicle body side member; and an anti-vibration member acting between the lever and the housing, the anti-vibration member being spaced from the abutment relative to a lengthwise extent of the lever so that the abutment is located between the pivot axis and the anti-vibration member.

9. A device as recited in claim 8, wherein the anti-vibration member is brought into abutting engagement with the housing before the lever is brought into abutting engagement with the piston when the lever is pivoted toward the housing.

10. A device as recited in claim 8, wherein the piston and another piston paired therewith are slidably inserted into the housing in parallel relation with each other, with an operating end of each piston protruding outside the housing.

11. A device as recited in claim 10, further comprising an equalizer having two ends, each of which is in abutting engagement with the operating end of one of the pistons, the equalizer also having a center portion in abutting engagement with the lever, and the anti-vibration member being interposed between the lever and the housing on a line which perpendicularly and equally divides a line segment connecting the pair of pistons.

12. A device as recited in claim 8, wherein the distance between the rear wheel side member and the vehicle body side member changes with changes in the load carried on the vehicle.

13. A device as recited in claim 8, wherein the lever is pivotable toward the housing for direct abutting engagement with the piston.

* * * * *